US012756257B2

(12) United States Patent
Dennis et al.

(10) Patent No.: US 12,756,257 B2
(45) Date of Patent: Oct. 6, 2026

(54) COIL ASSEMBLY OF AN INTEGRATED MOTOR PUMP OR TURBINE HAVING REDUCED THERMAL STRESS AT CRYOGENIC TEMPERATURES

(71) Applicant: Flowserve Pte. Ltd., Singapore (SG)

(72) Inventors: Zachary Dennis, Emmaus, PA (US); Neil Havrilla, Coplay, PA (US); Sean A. Cain, Tulsa, OK (US)

(73) Assignee: Flowserve Pte. Ltd., Singapore (SG)

( * ) Notice: Subject to any disclaimer, the term of this patent is extended or adjusted under 35 U.S.C. 154(b) by 337 days.

(21) Appl. No.: 18/415,977

(22) Filed: Jan. 18, 2024

(65) Prior Publication Data

US 2025/0239904 A1 Jul. 24, 2025

(51) Int. Cl.
*H02K 3/52* (2006.01)
*H02K 15/095* (2006.01)
*H02K 21/24* (2006.01)

(52) U.S. Cl.
CPC ........... *H02K 3/522* (2013.01); *H02K 15/095* (2013.01); *H02K 21/24* (2013.01); *H02K 2203/06* (2013.01); *H02K 2203/12* (2013.01)

(58) Field of Classification Search
CPC ..... F04D 13/0666; F04D 7/02; H02K 15/095; H02K 21/24; H02K 2203/06; H02K 2203/12; H02K 3/522
USPC ..................................................... 310/156.32
See application file for complete search history.

(56) References Cited

U.S. PATENT DOCUMENTS 1,632,357 A 6/1927 White
1,949,796 A 3/1934 Himmel
2,438,629 A 3/1948 Anderson
2,440,947 A 5/1948 Hart
(Continued)

FOREIGN PATENT DOCUMENTS

DE 102011077457 A1 12/2012
EP 2626573 A1 8/2013
(Continued)

OTHER PUBLICATIONS

Translation of foreign document DE 102011077457 A1 (Year: 2012).*
(Continued)

*Primary Examiner* — Alex W Mok
(74) *Attorney, Agent, or Firm* — Maine Cernota & Curran

(57) ABSTRACT

A coil assembly of a seal-less pump or turbine comprises materials having differing coefficients of thermal expansion that are layered but not bonded together, thereby reducing thermal stresses at cryogenic temperatures. Differences in shrinkage upon cooling provides compressive structural support. Coils are wound on hollow, non-magnetic spools, and a resin is applied for mechanical support, for example by vacuum impregnation. A release agent prevents bonding of the resin to the coils. The hollow spools are then placed over winding cores, such as laminated iron cores, without bonding. During cooling, the non-metallic spools shrink more than the cores, thereby providing compression fits. At ambient temperature, the spools can be held in place by interferences fits, and/or by key-stock pieces. Wired interconnections between the coils can be located within a wire harness cavity, which can be filled with a resin to provide mechanical support, while a release agent prevents bonding.

20 Claims, 15 Drawing Sheets

(56) References Cited

U.S. PATENT DOCUMENTS

| | | | |
|---|---|---|---|
| 2,752,857 | A | 7/1956 | White |
| 2,824,520 | A | 2/1958 | Bartels |
| 2,855,141 | A | 10/1958 | Van |
| 2,968,249 | A | 1/1961 | Caine |
| 3,102,679 | A | 9/1963 | Rudy |
| 3,135,212 | A | 6/1964 | John |
| 3,364,866 | A | 1/1968 | Sato |
| 3,868,196 | A | 2/1975 | Lown |
| 4,213,745 | A | 7/1980 | Roberts |
| 4,508,998 | A | 4/1985 | Hahn |
| 4,806,080 | A | 2/1989 | Mizobuchi |
| 5,117,141 | A | 5/1992 | Hawsey |
| 5,158,440 | A | 10/1992 | Cooper |
| 5,269,664 | A | 12/1993 | Buse |
| 5,332,374 | A | 7/1994 | Kricker |
| 5,494,418 | A | 2/1996 | Moriya |
| 5,567,133 | A | 10/1996 | Kobaybashi |
| 5,713,727 | A | 2/1998 | Veronesi et al. |
| 6,012,909 | A | 1/2000 | Sloteman |
| 6,034,465 | A | 3/2000 | Mckee |
| 6,056,518 | A | 5/2000 | Allen |
| 6,135,098 | A | 10/2000 | Allen |
| 6,175,173 | B1 | 1/2001 | Stephan |
| 6,422,838 | B1 | 7/2002 | Sloteman |
| 6,835,051 | B2 | 12/2004 | Heim |
| 7,067,950 | B2 | 6/2006 | Hirzel |
| 7,380,335 | B2 * | 6/2008 | Hashimoto ........ H02K 15/0431 242/433 |
| 7,467,648 | B2 * | 12/2008 | Hashimoto .......... H02K 15/043 140/71 C |
| 8,303,268 | B2 | 11/2012 | Werson |
| 9,203,274 | B2 * | 12/2015 | Tashiro .............. H02K 15/0431 |
| 9,614,406 | B2 * | 4/2017 | Johnson ................... H02K 3/48 |
| 9,985,488 | B2 * | 5/2018 | Goodyear .............. H02K 3/522 |
| 11,323,003 | B2 | 5/2022 | Judge |
| 2002/0035974 | A1 | 3/2002 | Pawellek |
| 2002/0106290 | A1 | 8/2002 | Bader |
| 2003/0021683 | A1 | 1/2003 | Capone |
| 2004/0013547 | A1 | 1/2004 | Allen |
| 2005/0196269 | A1 | 9/2005 | Racer |
| 2007/0048158 | A1 | 3/2007 | Kochan, Jr. |
| 2009/0208349 | A1 | 8/2009 | Eller |
| 2011/0164995 | A1 | 7/2011 | Genster |
| 2011/0192019 | A1 * | 8/2011 | Shijo .................. H02K 15/0431 242/577 |
| 2011/0238172 | A1 | 9/2011 | Akdis |
| 2011/0318175 | A1 | 12/2011 | Converse |
| 2012/0319507 | A1 | 12/2012 | Ueno |
| 2013/0022163 | A1 * | 1/2013 | Goodyear ................ H02K 3/18 376/361 |
| 2013/0028760 | A1 | 1/2013 | Lin |
| 2013/0213325 | A1 | 8/2013 | Kim |
| 2013/0236341 | A1 | 9/2013 | Anderson |
| 2015/0104335 | A1 | 4/2015 | Faller |
| 2016/0006379 | A1 | 1/2016 | Wang et al. |
| 2016/0072362 | A1 | 3/2016 | Kube |
| 2016/0305447 | A1 | 10/2016 | Dreiss et al. |
| 2018/0278108 | A1 * | 9/2018 | Goodyear .............. G21C 15/24 |
| 2019/0145428 | A1 | 5/2019 | Judge et al. |
| 2020/0067376 | A1 | 2/2020 | Judge |
| 2020/0136453 | A1 | 4/2020 | Manz |
| 2020/0395808 | A1 | 12/2020 | Tokoi |
| 2021/0317729 | A1 * | 10/2021 | Sheth ..................... H02K 5/132 |
| 2021/0320549 | A1 * | 10/2021 | Sheth ..................... H02K 5/132 |
| 2022/0186736 | A1 * | 6/2022 | Mcsheery ........... F04D 29/2261 |

FOREIGN PATENT DOCUMENTS

| | | | |
|---|---|---|---|
| JP | 2017163727 | A | 9/2017 |
| WO | 9908366 | A1 | 2/1999 |
| WO | 2010081123 | A1 | 7/2010 |

OTHER PUBLICATIONS

PCT International Search Report & Written Opinion for Appl No. PCT/US2018/060690 dtd Mar. 12, 2019, 17 pages.
Office Action for U.S. Appl. No. 16/204,997 dated Jul. 2, 2020, 6 Pages.
Office Action for U.S. Appl. No. 16/668,665, dated Dec. 4, 2020, 6 Pages.
Office Action for U.S. Appl. No. 16/668,665, dated Jan. 15, 2021, 50 Pages.
International Search Report and Written Opinion for PCT Appl. No. PCT/US2020/056972, mail date Feb. 17, 2021, 11 Pages.
Office Action for U.S. Appl. No. 16/668,665, dated May 3, 2021, 27 Pages.
Advisory Action for U.S. Appl. No. 16/668,665 mail date Jul. 14, 2021, 5 pages.
Notice of Allowance for U.S. Appl. No. 16/668,665 mail date Feb. 22, 2022, 17 Pages.
International Preliminary Report on Patentability for PCT Appl. No. PCT/US2020/056972 Mail Date May 12, 2022, 8 pages.
Office Action for India Appl. No. 202217025766, dated Aug. 18, 2022, 7 Pages.
Extended European Search Report of EP Appl No. 20882691.7, mail date Nov. 11, 2022, 8 pages.
Office Action for JP application No. 2022-524573 mail date Jul. 18, 2023, 6 pages.
Redmond, Jesse H., Bott, Fred W. "Development of Cryogenic Electric Motors". National Aeronautic and Space Engineering and Manufacturing Meeting, Paper No. 753D (1963) [Retrieved on Sep. 7, 2023] retrieved from SAE International, 12 pages.
Rush; Steve, Hall; Lonn "Tutorial on Cryogenic Submerged Electric Motor Pumps" Proceedings on the 18th International Pump Users Symposium. p. 101-108.
International Search Report and Written Opinion for PCT Application No. PCT/US2024/062060 mail date Apr. 21, 2025, 11 pages.

* cited by examiner

COIL ASSEMBLY OF AN INTEGRATED MOTOR PUMP OR TURBINE HAVING REDUCED THERMAL STRESS AT CRYOGENIC TEMPERATURES

RELATED APPLICATIONS

This application is related to U.S. Pat. No. 11,323,003, issued on May 3, 2022, which is herein incorporated by reference in its entirety for all purposes.

FIELD OF THE INVENTION

The invention relates to pumps and turbines, and more particularly, to integral motor pumps and integral motor turbines configured for application to cryogenic liquids.

BACKGROUND OF THE INVENTION

Application of cryogenic turbomachinery, such as pumps and turbines, to liquified gases at extremely low temperatures can give rise to several unconventional issues, due to the aggressive conditions that are presented by the cryogenic liquids. Traditional pumps that use an external motor to drive one or more impellers via a rotating shaft have the advantage that only the impellers are exposed to the cryogenic temperatures. However, the impeller shaft can provide a significant channel through which heat can flow from the environment into the cryogenic liquid, thereby increasing boiloff of the cryogenic liquid. Also, this approach can require significant maintenance, resulting in high operating costs. Furthermore, this approach requires application of a mechanical seal or other rotating shaft seal to the rotating impeller shaft, which is not practical in many cases, due to potential leakage of lubricants and/or process liquid past the seals when applied to cryogenic liquids. Also, reliable rotating shaft seals can be difficult and expensive to implement, especially for cryogenic liquids that have very low viscosities, such as liquid hydrogen (LH2), resulting in a massive amount of seal leakage, which can represent a substantial economic concern, as well as a safety and environmental hazard.

With reference to FIG. 1A, another approach is to use a "seal-less" submersible pump or turbine that includes a submerged, internal electrical motor or generator 132, shaft 140, and one or more impellers 130, all contained within a common housing 134. This integrated motor-pump or turbine (IMP or IMT) approach eliminates any need for rotating shaft seals, and allows for the motor 132 to be cooled by the cryogenic process fluid, which allows higher energy density motor designs to be implemented, which can deliver higher output torques at increased speeds.

Typically, in an IMP or IMT, one or more impellers 130 is/are attached to a rotating shaft 140 that is also fixed to a rotor assembly 138. The rotor assembly 138 typically comprises an electrical coil assembly if it is an asynchronous induction type motor 132, or a permanent magnet assembly if it is a synchronous type motor 132. The rotor assembly 138 is surrounded by a stator assembly 132, which typically includes an electrical coil assembly 136.

The electrical coil assemblies 132, 136 of the stator, and in some cases also the rotor, typically comprise coils of insulated wire that are wound around winding cores that can be metallic, ferromagnetic cores, such as laminated iron or steel cores. The coils are impregnated and surrounded by an insulating barrier material, such as a resin, which fixes the coil wires to the winding cores, and also prevents the coil wires from vibrating due to surging electrical currents and/or magnetic fields, which could otherwise lead to degradation of the coils, including metal fatigue and breakage of the copper wires.

However, while IMPs and IMTs have the advantage that rotating shaft seals are not needed, they have the disadvantage that the motor assemblies are subjected to cryogenic temperatures, which gives rise to several technical challenges, including thermal management, material compatibility, and extreme thermal contractions. In particular, IMP and IMT coil assemblies that will be exposed to cryogenic temperatures must be carefully constructed to allow for large thermally induced stresses due to unequal dimensional shrinkage, while maintaining adequate electrical and magnetic properties. This can be especially challenging for IMPs and IMTs that will be applied to liquid hydrogen (LH2), due to the very low temperature of LH2, and to its exceedingly low density, which can enable LH2 to penetrate even very small "micro-cracks" that form due to freezing and contraction of elements within the pump or turbine.

The collection, transport, and distribution of liquid hydrogen (LH2) is of increasing importance, due to the growing use of hydrogen as a fuel supply. In particular, "green" hydrogen is expected to play a critical role in reducing carbon emissions over the next few decades. The term "green" hydrogen refers to hydrogen that is produced using renewable clean energy sources, such as solar power and wind power.

Renewable energy generators, such as windmills and solar panels, can sometimes be installed proximate energy consumption locations, such as placing solar panels on the roof of a building or installing a windmill next to a factory. However, this approach is limited, due to siting constraints and economies of scale. Instead, it is often preferable to construct large green energy facilities in optimal locations, such as large solar panel arrays in deserts or windmill farms in coastal waters, and then to convey their power output to remote locations of energy consumption. In addition to taking advantage of favorable environments, and gaining economy of scale, this approach has the advantage of being able to utilize existing electrical power distribution networks to benefit larger numbers of energy consumers. However, it remains necessary to site such facilities near the electrical grids of consumers.

Instead, with reference to FIG. 1B, green energy produced 102 at a remote location 100 that includes a source of water 104 can be used to generate hydrogen gas via hydrolysis 106. The hydrogen gas is compressed 108, and can be distributed to electrical generation plants wherever it is needed, in a manner similar to natural gas distribution. As with natural gas, it is often more efficient to liquefy 110 hydrogen gas before it is transported 116, thereby eliminating safety concerns associated with gas pressurization, and enabling an increased energy density to be enclosed within a given container space. Typically, the LH2 is stored 112, and then transferred 114 to ships, train cars, or trucks as needed. Finally, after the LH2 has been shipped 116 to an import location 118, it is transferred 120 and stored 122 in a storage container, from which it can be transferred to local energy generating plants, e.g. by trucks 124.

This approach requires that liquid hydrogen LH2 be pumped from the liquification apparatus 110 into a storage container 112, and then unloaded 114 and pumped to a container of a ship or other transport vehicle 116. The LH2 is then pumped from the transporting vehicle 116 to an import storage container 120, and finally it is pumped from local storage 122 to local distribution vehicles 124 such as trucks. Energy efficient pumping of LH2 is therefore a critical component of this approach.

Efficient and reliable pumping of LH2 is therefore a critical requirement of this approach of using LH2 to distribute energy from production sites to consumers. If the pumps that are applied to LH2 require frequent repair or replacement, the distribution of "green" hydrogen will be more expensive and disruptions will be more frequent.

What is needed, therefore, is a coil assembly for an integrated motor-pump (IMP) or integrated motor-turbine (IMP) that minimizes the thermal stresses to which the coil assembly is subjected when the coil assembly is cooled to cryogenic temperatures.

SUMMARY OF THE INVENTION

The present invention is a coil assembly for an integrated motor-pump (IMP) or integrated motor-turbine (IMP) that minimizes the thermal stresses to which the coil assembly is subjected when the coil assembly is cooled to cryogenic temperatures.

For simplicity, the present disclosure sometimes refers simply to IMPs, i.e. to pumps that include motors. However, it will be understood that the disclosure presented herein applies equally to turbines that include generators, and that references herein to IMPs and other pumps refer generically to both pumps (IMPs) and turbines (IMTs), while references to motors refer generically to motors and generators or alternators, unless otherwise stated or required by context. Also, it will be understood that references made herein to the electrical coils included in a stator of an IMP or IMT refer generically to electrical coils included in the stator and/or the rotor, unless otherwise stated or required by context.

The disclosed coil assembly provides a flexible internal configuration, that allows for individual components of the coil assembly to grow and shrink at their own rates, without imparting stresses on neighboring components made from dissimilar materials. This is accomplished by layering materials having differing coefficients of thermal expansion (CTE) for structural support, while ensuring that materials having differing CTEs are not bonded to each other. Instead, the materials of construction are chosen such that the differences in CTE result in compression fits of the components to each other when the coil assembly is cooled, thereby providing structural integrity while eliminating the thermal stresses that would otherwise result from bonds between dissimilar materials.

Rather than winding insulated wire directly onto winding cores to provide a coil assembly, the disclosed method of construction includes winding insulated wire around a non-metallic, hollow "coil spool." In embodiments, the coil spools are made from a glass-filled fluoropolymer or an engineering plastic. The insulated wire is not bonded to the coil spool and is initially held in place on the coil spool by virtue of being tightly wound around the coil spool and, in embodiments, taped in place by a non-conductive tape.

Once the insulated wire has been wrapped around the coil spool to form an electrical coil, the coil spool is placed onto a fixture having substantially the same shape as the winding core to which the individual winding assembly will eventually be applied, and a release agent is applied to the coil. A barrier material, such as an epoxy resin, is applied to the coil, thereby securing the coil to the coil spool to form an individual winding assembly, while the release agent prevents direct bonding of the barrier material to the coil. The epoxy or other barrier material thereby provides structural support to the coil without being directly bonded to the insulated wires, which reduces or eliminates thermal stress between the coil and the barrier material when the coil assembly is cooled to cryogenic temperatures. In embodiments, the barrier material is applied using a vacuum pressure impregnation (VPI) process. In various embodiments, the CTE of the barrier material is closely matched to the CTE of the insulated wire, thereby further reducing thermal stress between the barrier material and the coil when the coil assembly is cooled.

The resulting individual winding assembly, comprising the coil and hollow coil spool with applied barrier material, is then removed from the fixture and placed directly onto one of the winding cores of the stator, without applying any resin or other bonding between the winding core and the individual winding assembly. In embodiments, the winding cores are ferromagnetic metal cores, such as laminated iron or steel cores. Because the coil spool is non-metallic, it shrinks more than the ferromagnetic core when the coil assembly is cooled to a cryogenic temperature, and is strongly held to the ferromagnetic core by a compression fit.

Once the individual winding assemblies have all been prepared and placed onto the winding cores, they are interconnected with each other, and/or with an external power source (for IMPs) or external power receptor (for IMTs), by wired connections, for example in a star or delta pattern. In embodiments, the wired connections are brazed connections. In various embodiments, the wired connections are routed within an internal wire harness cavity, which in embodiments is formed between two cylindrical bracket support components, and a release agent is applied to the insulated wires of the wired connections. The wire harness cavity is then filled with a barrier material, such as an epoxy resin. Due to application of the release agent to the wired connections, the barrier material provides structural support to the wired connections within the wire harness cavity, but is not bonded to the wired connections, nor to the wire harness cavity.

As noted above, the individual winding assemblies are placed over the winding cores without being bonded thereto. Some embodiments rely exclusively on an interference fit to avoid inadvertent dislodging of the winding assemblies from the winding cores when the coil assembly is at ambient temperature. In other embodiments, key-stock pieces are inserted above the winding assemblies and held in place by overhanging "teeth" provided at the tops of the winding cores. In some of these embodiments, the key-stock pieces are made from the same, or a similar, non-metallic material as the coil spools, and in various embodiments they are not bonded in place, thereby allowing for greater flexibility and tolerance of thermal contractions.

Finally, in embodiments, a wire feedthrough is inserted into a cable exit port provided in the coil assembly housing, thereby providing electrical access to the coil windings of the stator while excluding process liquid from flowing past the wire feedthrough.

A first general aspect of the present invention is an integrated motor pump (IMP) or integrated motor turbine (IMT) configured for application to a process liquid. The IMP or IMT includes a coil assembly, which comprises a plurality of winding cores provided within a coil assembly housing and a plurality of individual winding assemblies. Each of the individual winding assemblies includes a hollow, non-metallic coil spool and an electrical coil wound about the coil spool and held in place about the coil spool by a barrier material, wherein said barrier material mechanically supports the electrical coil but is not bonded to the electrical coil and is not bonded to the coil spool. The coil assembly further includes a plurality of wired connections configured to provide electrical communication among the electrical coils and/or between the electrical coils and an external power source or power receptor. For each of the winding cores, a corresponding one of the plurality of individual winding assemblies is installed over the winding core, such that the winding core extends within and through a central cavity of the coil spool of the individual winding assembly, the individual winding assembly being constrained in location by the winding core without being bonded to the winding core.

In embodiments, the winding cores are ferromagnetic laminates.

In any of the above embodiments, the coil spool can be made from an engineering plastic or a glass-filled fluoropolymer.

In any of the above embodiments, the barrier material can be a resin;

In any of the above embodiments, the wired connections can be routed through a wire harness cavity. In some of these embodiments, the wire harness cavity is formed between bracket support components. In some of these embodiments, the wire harness cavity is filled with a stabilizing substance that mechanically supports the wired connections but is not bonded to the wired connections, and is not bonded to the wire harness. The stabilizing substance can be a resin.

Any of the above embodiments can further include a wire feedthrough inserted into a cable exit port provided in the coil assembly housing, the wire feedthrough providing electrical access to the wired connections while excluding the process liquid from flowing past the wire feedthrough.

Any of the above embodiments can further include a plurality of key-stock pieces positioned above the individual winding assemblies and configured to prevent dislodging of the individual winding assemblies from the winding cores. In some of these embodiments, the key-stock pieces are inserted between upper surfaces of the individual winding assemblies and overhanging teeth of the winding cores. And in some of these embodiments the key-stock pieces are not bonded to the individual winding assemblies and are not bonded to the overhanging teeth of the winding cores.

A second general aspect of the present invention is a method of manufacturing a coil assembly of an integrated motor pump (IMP) or integrated motor turbine (IMT). The method includes providing a plurality of winding cores, preparing a plurality of individual winding assemblies, wherein for each of the individual winding assemblies, said preparing of the individual winding assembly comprises: winding insulated wire about a hollow, non-metallic coil spool, the insulated wire being thereby formed into an electrical coil, placing the coil spool together with said electrical coil onto a fixture, said fixture having a shape that is substantially identical to a shape of a corresponding one of the plurality of winding cores, applying a first release agent to the electrical coil, applying a barrier material to the electrical coil, such that said barrier material mechanically supports the electrical coil but is prevented by the first release agent from bonding to the electrical coil, the coil spool, electrical coil, and applied barrier material thereby forming the individual winding assembly, and removing the individual winding assembly from the fixture. For each of the winding cores, the method includes installing a corresponding one of the plurality of individual winding assemblies over the winding core, such that the winding core extends within and through a central cavity of the coil spool of the individual winding assembly, the individual winding assembly being constrained in location by the winding core without being bonded to the winding core, and forming a plurality of wired connections to the electrical coils, wherein the wired connections provide electrical communication among the electrical coils and/or between the electrical coils and an external power source or an external power receptor.

In embodiments, the method further comprises routing the wired connections through a wire harness cavity of the coil assembly. In some of these embodiments, the wire harness cavity is formed between bracket support components. In some of these embodiments, the method further comprises applying a second release agent to the wired connections; and filling the wire harness cavity with a stabilizing substance such that the stabilizing substance mechanically supports the wired connections but is prevented by the second release agent from bonding to the wired connections and from bonding to the wire harness. The stabilizing substance can be a resin.

Any of the above embodiments can further include positioning key-stock pieces above the individual winding assemblies such that the key-stock pieces prevent dislodging of the individual winding assemblies from the winding cores. In some of these embodiments installing the key-stock pieces includes inserted the key-stock pieces between upper surfaces of the individual winding assemblies and overhanging teeth of the winding cores. And in some of these embodiments installing the key-stock pieces does not include bonding the key-stock pieces to the upper surfaces of the individual winding assemblies, and does not include bonding the key-stock pieces to the overhanging teeth of the winding cores.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present invention is a coil assembly for an integrated motor-pump (IMP) or integrated motor-turbine (IMP) that minimizes the thermal stresses to which the coil assembly is subjected when the coil assembly is cooled to cryogenic temperatures.

While references are sometimes made herein to stator coil assemblies, or simply to coil assemblies, it will be understood that such references refer generically to electrical coil assemblies included in a stator and/or a rotor, unless otherwise stated or required by context.

Figure 1A:
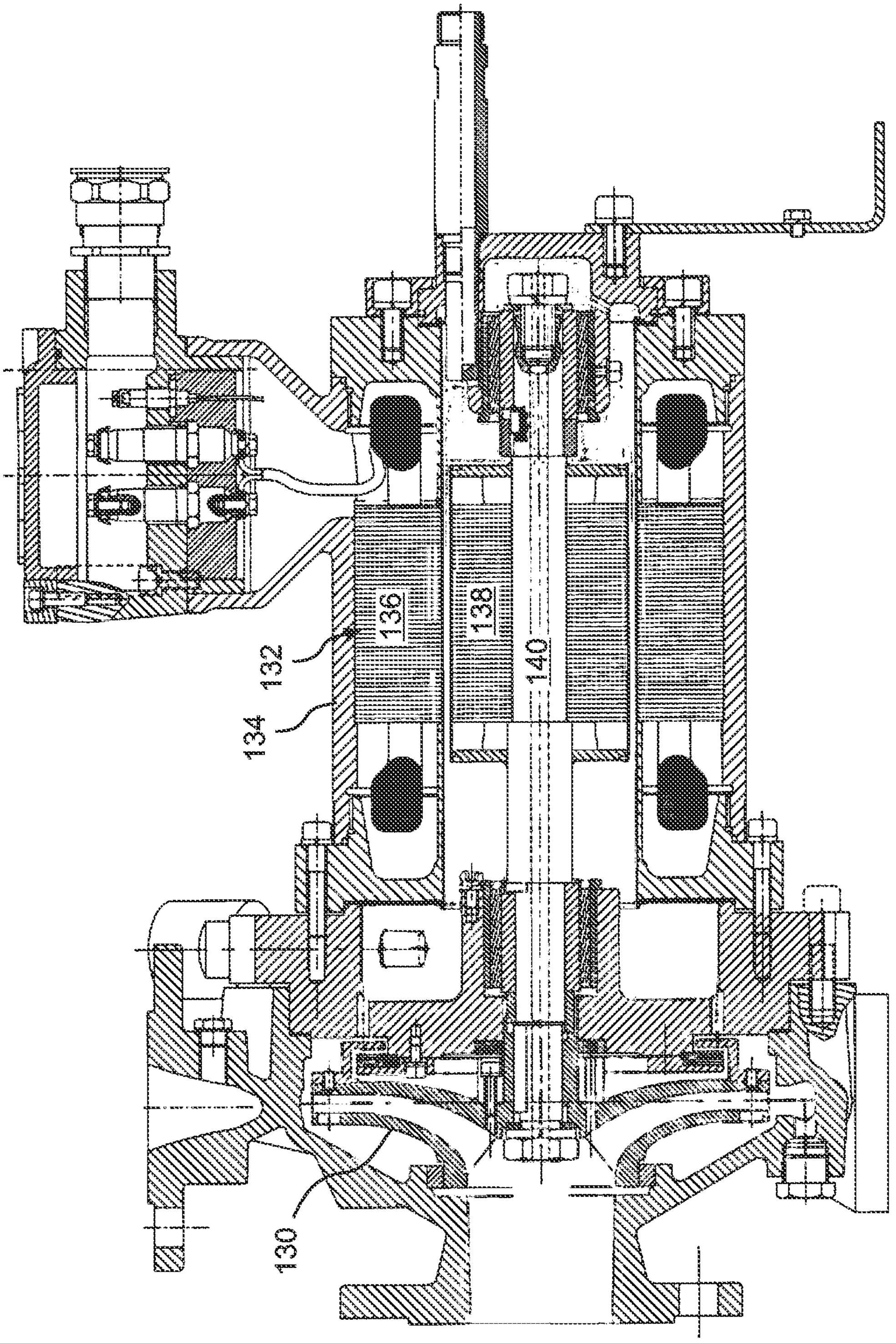
Fig. 1A (Prior Art)
FIG. 1A is a sectional view of a sealless pump of the prior art.
Figure 1B:
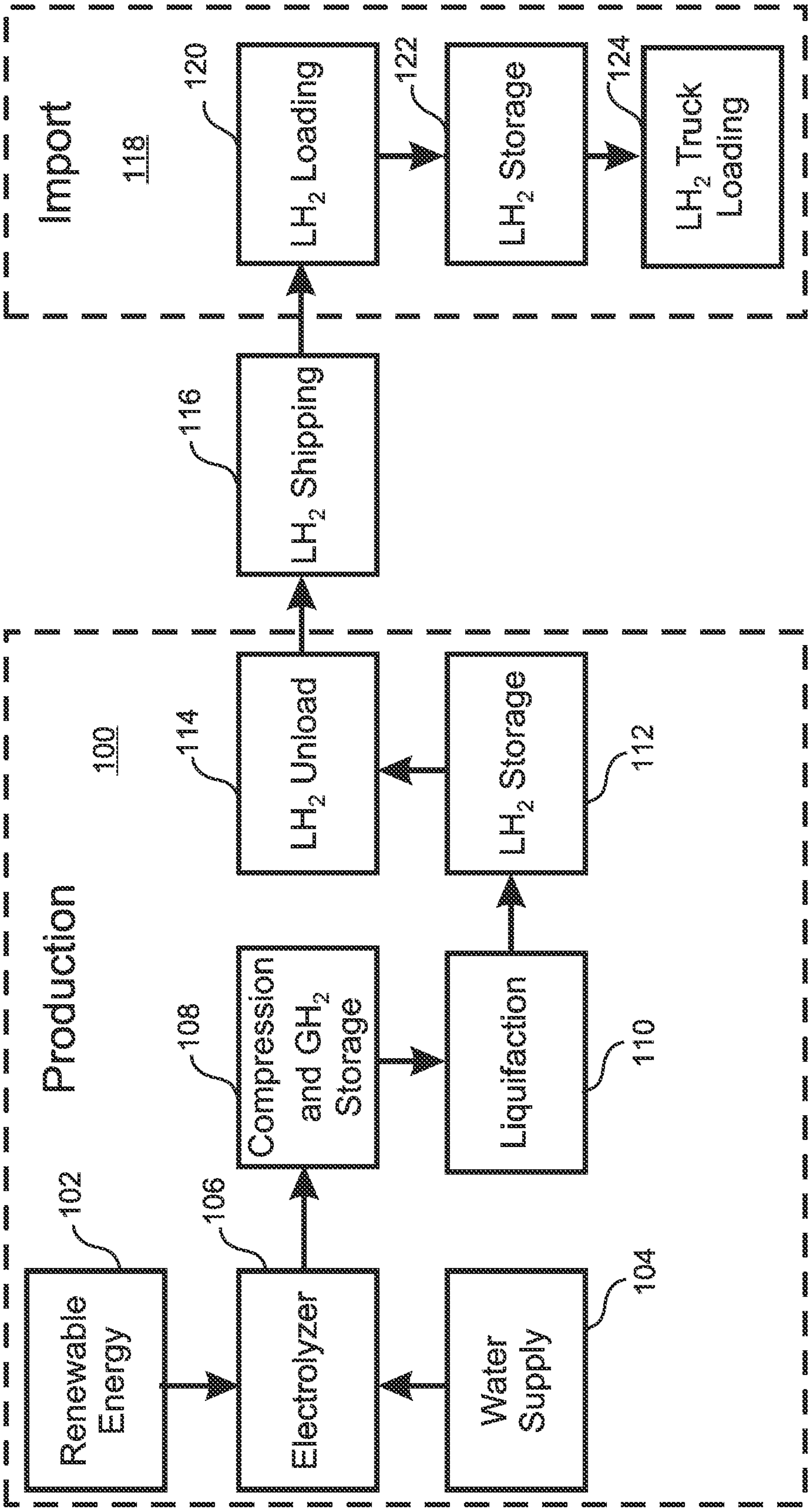
Fig. 1B (Prior Art)
FIG. 1B is a flow diagram illustrating the use of liquid hydrogen in the prior art as a medium for transferring energy from a green energy production site to an energy consumption location.

Also, while the present invention is sometimes described herein with reference to an embodiment that is an axial, directly driven IMP, it will be clear to one of skill in the art that the present invention is applicable to many other configurations of IMP and IMT internal motors, including radial, directly driven IMPs and IMTs, as well as rotating shaft IMPs and IMTs, such as the configuration shown in FIG. 1A.

With reference to FIGS. 2A through 2D, in the illustrated embodiment, the disclosed IMP or IMT implements an axial "direct drive" configuration that is similar to configurations disclosed in U.S. Pat. No. 11,323,003, also by the present applicant, which is herein incorporated by reference in its entirety for all purposes. Rather than configuring an armature 138 and stator 136 in a separate motor 132 to drive a shaft 140 that drives an impeller 130, as illustrated in FIG. 1A, permanent magnets 204 are attached directly to the impeller 202, and arranged such that they are proximally and axially aligned with stator coils 208 provided in a stator housing 206, such that the stator 232 is able to impart torque directly to the impeller 202, rather than following the approach of FIG. 1A by imparting torque to a shaft 140, and thereby indirectly imparting torque to the impeller 130. In some applications, the shaft 216 is a "stub" that is firmly anchored, either directly or indirectly, to the stator housing 206, while the impeller 202 is rotationally supported on the shaft 216 by a bearing 214, such that only the impeller 202, permanent magnets 204, and bearing 214 rotate.

Figure 2A:
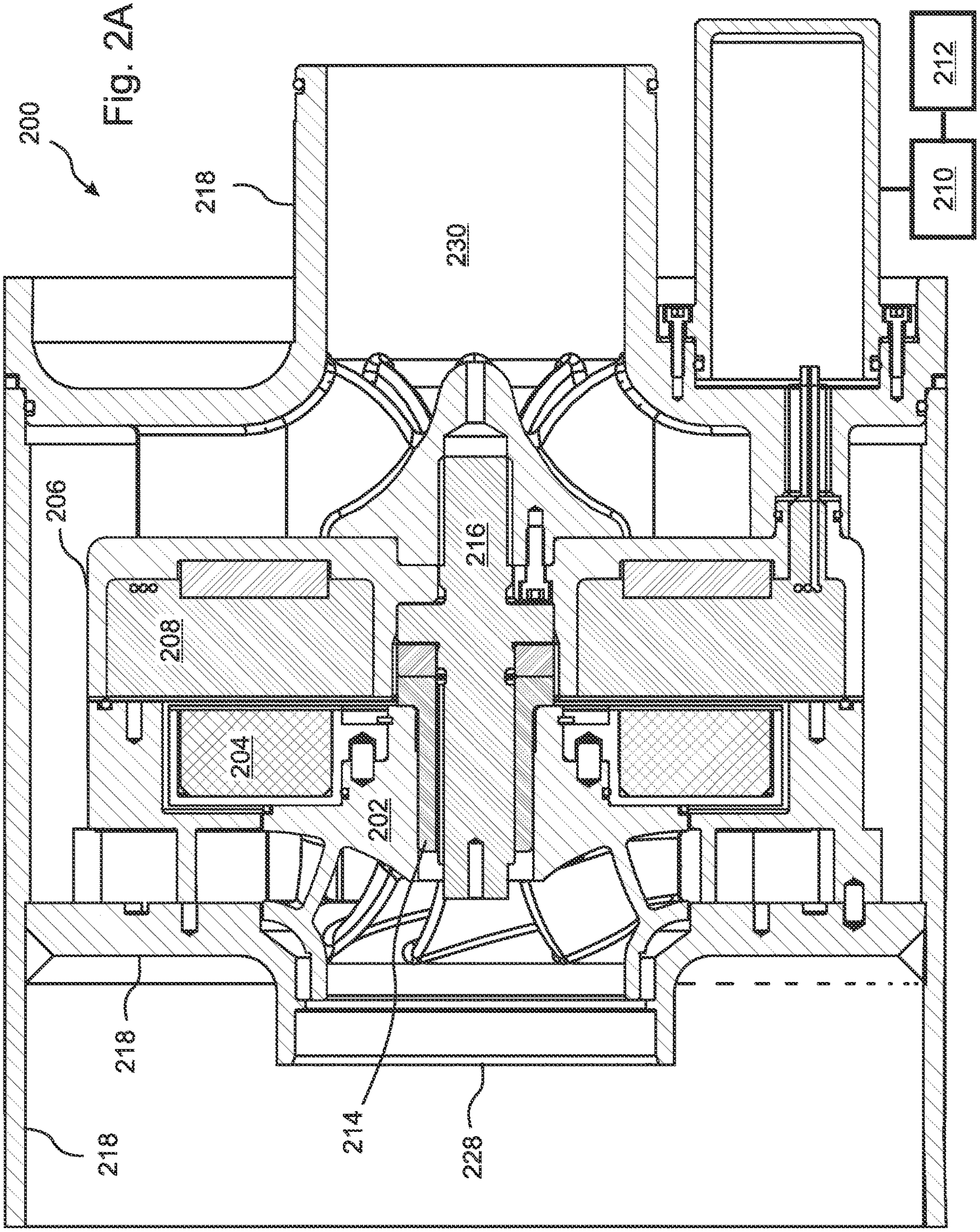
FIG. 2A is a sectional view of an IMP or IMT in an embodiment of the present invention, where the figure is drawn to scale except for elements 210 and 212.

FIG. 2A illustrates an IMP in an embodiment that is configured to draw a fluid from an inlet 228 and deliver the fluid to an outlet 230. The "rotor," i.e. the assembly of rotating components, in the IMP 200 comprises an impeller 202 and a plurality of permanent magnets 204 that are cooperative with the impeller 202. The IMP 200 further includes a stator 232 that comprises a stator housing 206 containing stator coils 208 that are positioned in axial opposition to the permanent magnets 204.

The stator coils 208 are energized by a power source 210 that is actuated by a controller 212, and the magnets 204 and stator coils 208 function cooperatively together as a synchronous motor that applies rotational torque directly to the impeller 202. In some embodiments, the power source 210 is an adjustable speed drive (ASD), such as a variable frequency drive (VFD), which enables the impeller rotation rate to be variable.

In addition to the impeller 202 and the permanent magnets 204, the rotor includes a bearing 214 configured to allow the rotor to rotate about a fixed, non-rotating shaft "stub" 216. In the illustrated embodiment, the bearing 214 is product lubricated, and the shaft 216 is firmly anchored to the stator housing 206, which is firmly attached to the IMP housing 218. The shaft 216 is a "stub" that is only slightly longer than the bearing 214, and does not rotate. It can be seen in the close-up, partial view of FIG. 2B that only a very narrow gap 226 separates the permanent magnets 204 from the stator coils 208.

Figure 2B:
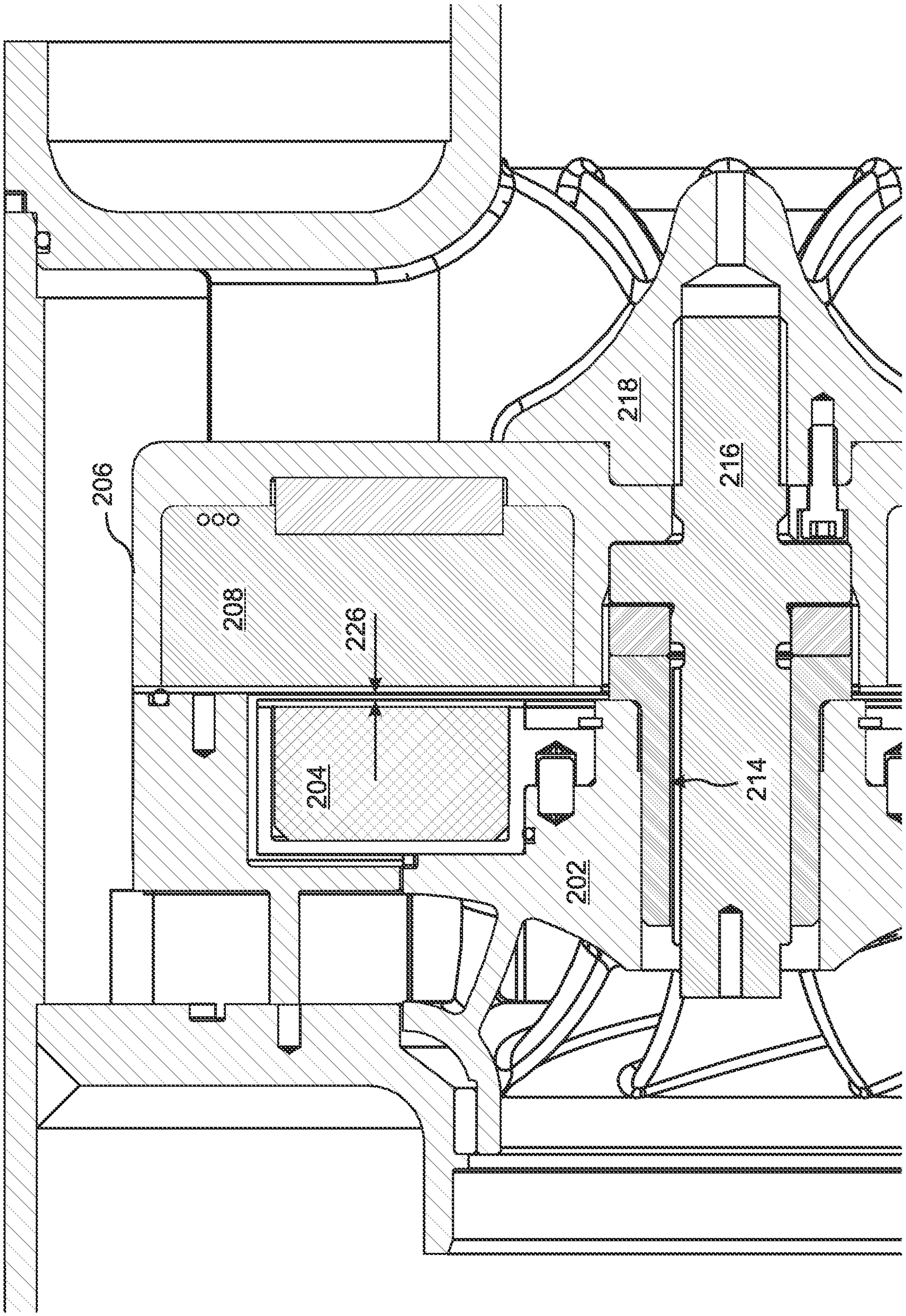
FIG. 2B is a close-up view, drawn to scale, of a portion of the IMP or IMT of FIG. 2A.
Figure 2C:
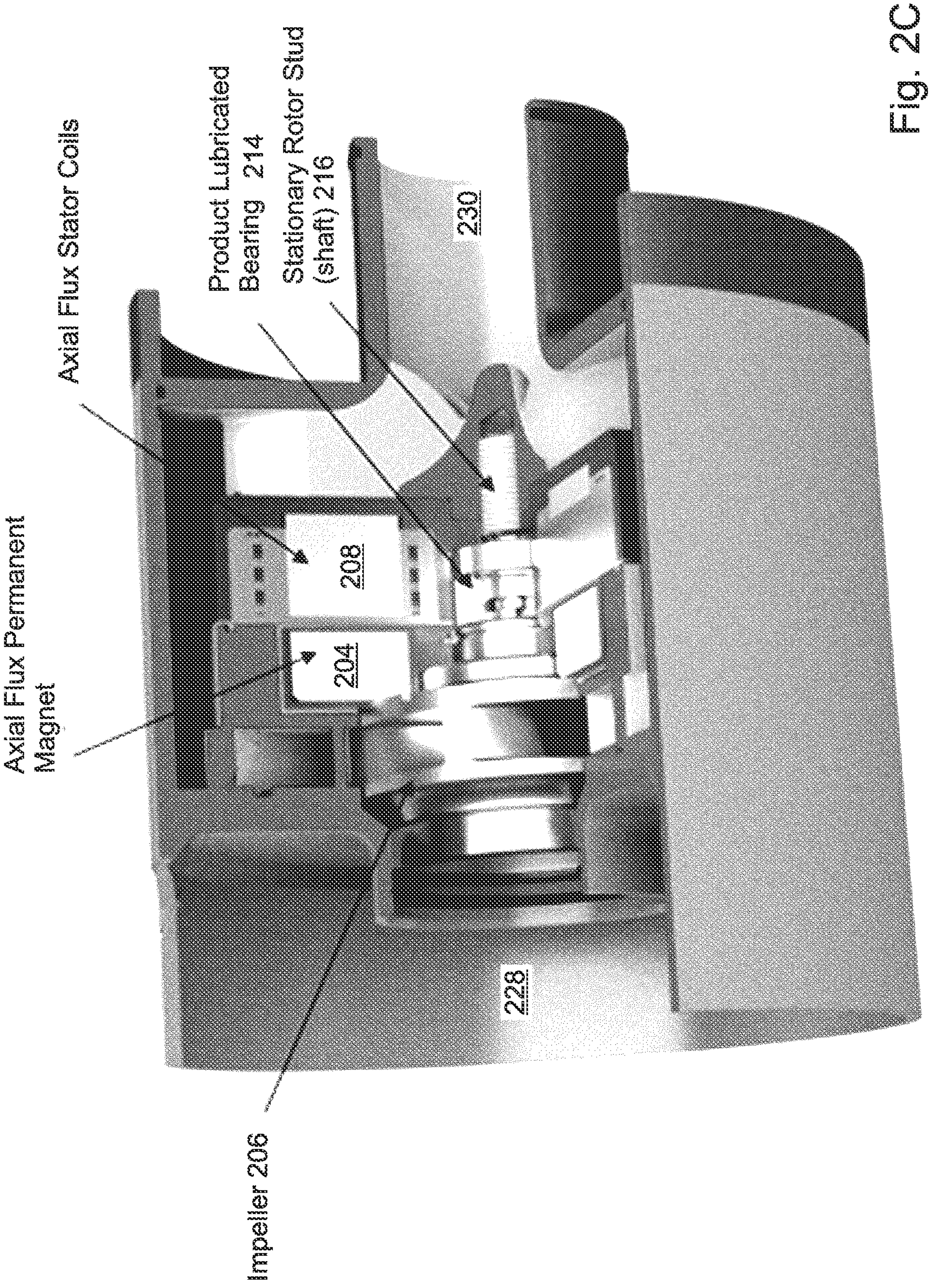
FIG. 2C is a perspective cutaway view, drawn to scale, of the IMP of FIG. 2A.
Figure 2D:
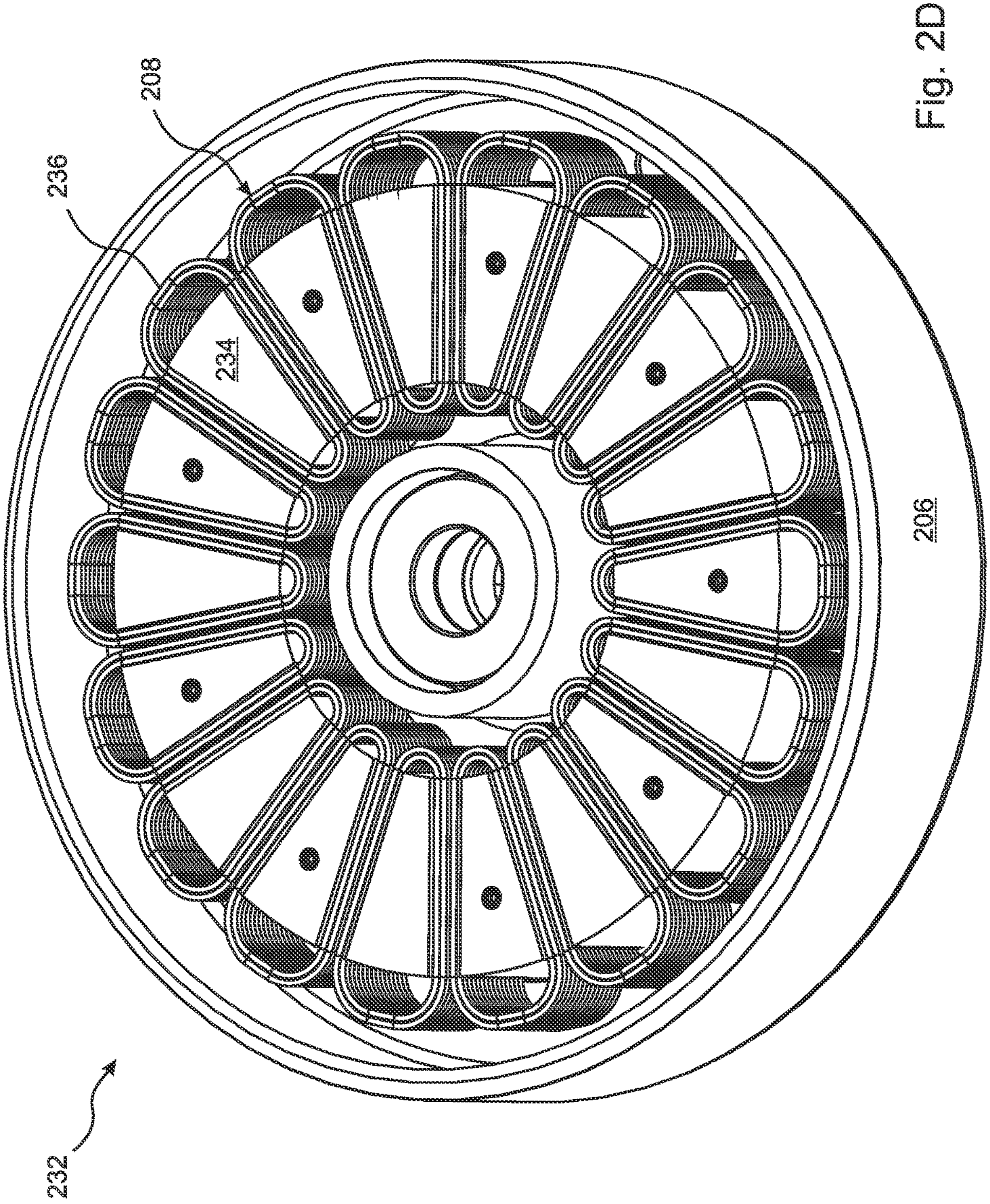
FIG. 2D is a perspective view from above, drawn to scale, of the stator of FIG. 2A.

FIG. 2D is a perspective view of the stator 232 of FIGS. 2A-2C. It can be seen in the figure that each of the stator coils 208 of the stator coil assembly 236 is wound on a winding core 234, which can be a laminated iron or steel core 234. Note that the resin (306 in FIG. 3D) that is applied to the coils 208 has been omitted from FIG. 2D for clarity of illustration.

The disclosed coil assembly provides a flexible internal configuration that allows for individual components of the coil assembly to grow and shrink at their own rates, without imparting stresses on neighboring components made from dissimilar materials. This is accomplished by layering materials having differing coefficients of thermal expansion (CTE) for structural support, while ensuring that materials having differing CTEs are not bonded to each other. Instead, the materials of construction are chosen such that the differences in CTE result in compression fits of the components to each other when the coil assembly is cooled, thereby providing structural integrity while eliminating the thermal stresses that would otherwise result from bonds between dissimilar materials.

Figure 3A:
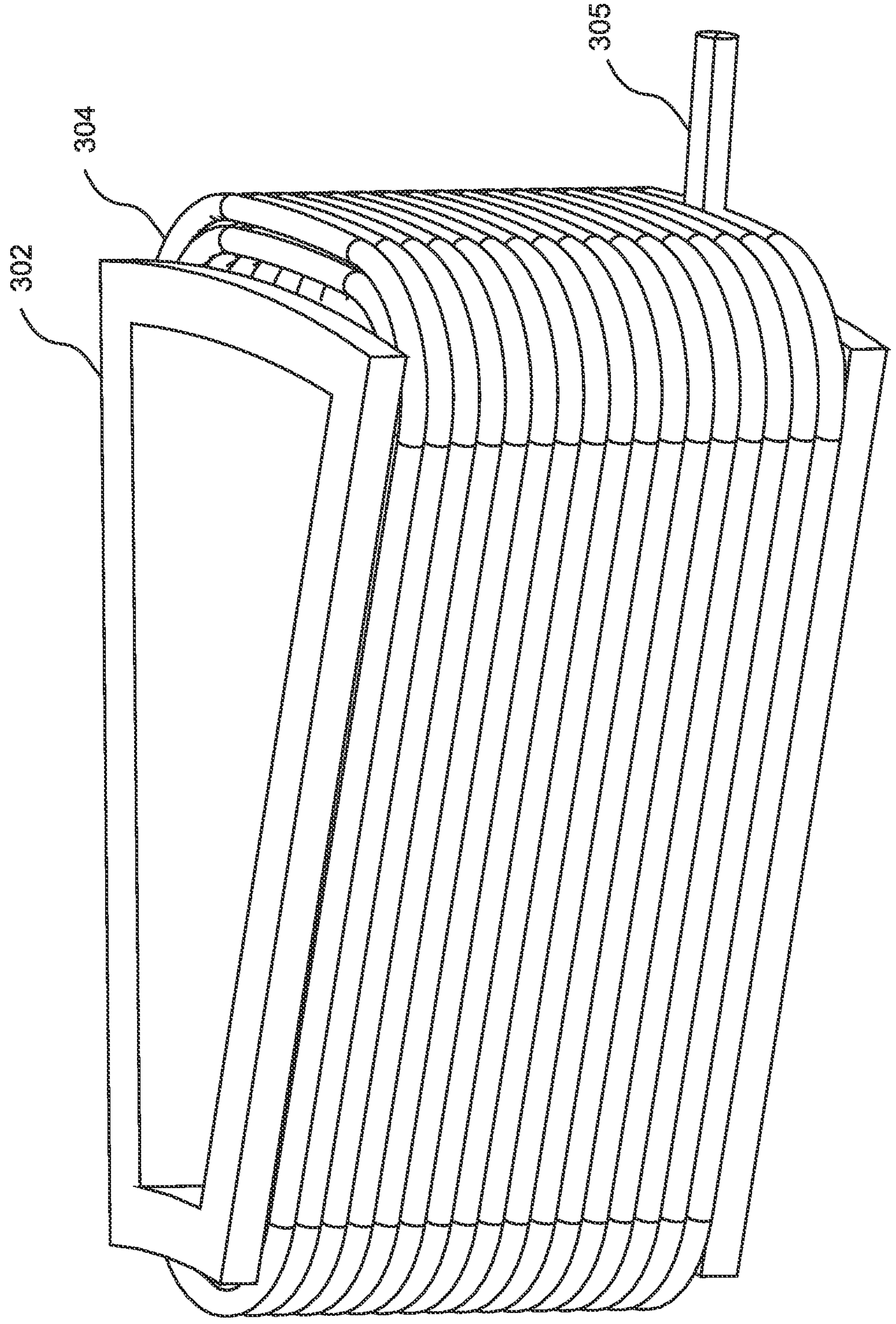
FIG. 3A is a perspective view, drawn to scale, of a coil wound on a coil spool according to an embodiment of the present invention.

With reference to FIGS. 3A-3E and FIGS. 4A-B, the disclosed method of constructing the coil assembly 402 of the present invention includes preparing individual winding assemblies 300, and then placing the winding assemblies 300 onto the winding cores 234 of the stator 400. With reference to FIG. 3A, rather than winding insulated wire directly onto the winding cores 234, each of the coils 304 is formed by winding insulated wire around a non-metallic, hollow "coil spool" 302. In embodiments, the coil spools 302 are made from a glass-filled fluoropolymer or an engineering plastic. The insulated wire is not bonded to the coil spool 302, and is initially held in place on the coil spool 302 by virtue of being tightly wound around the coil spool 302 and, in embodiments, taped in place by a non-conductive tape. In the illustrated embodiment, connection lead wires 305 extend out from the electrical coil 304.

Figure 3B:
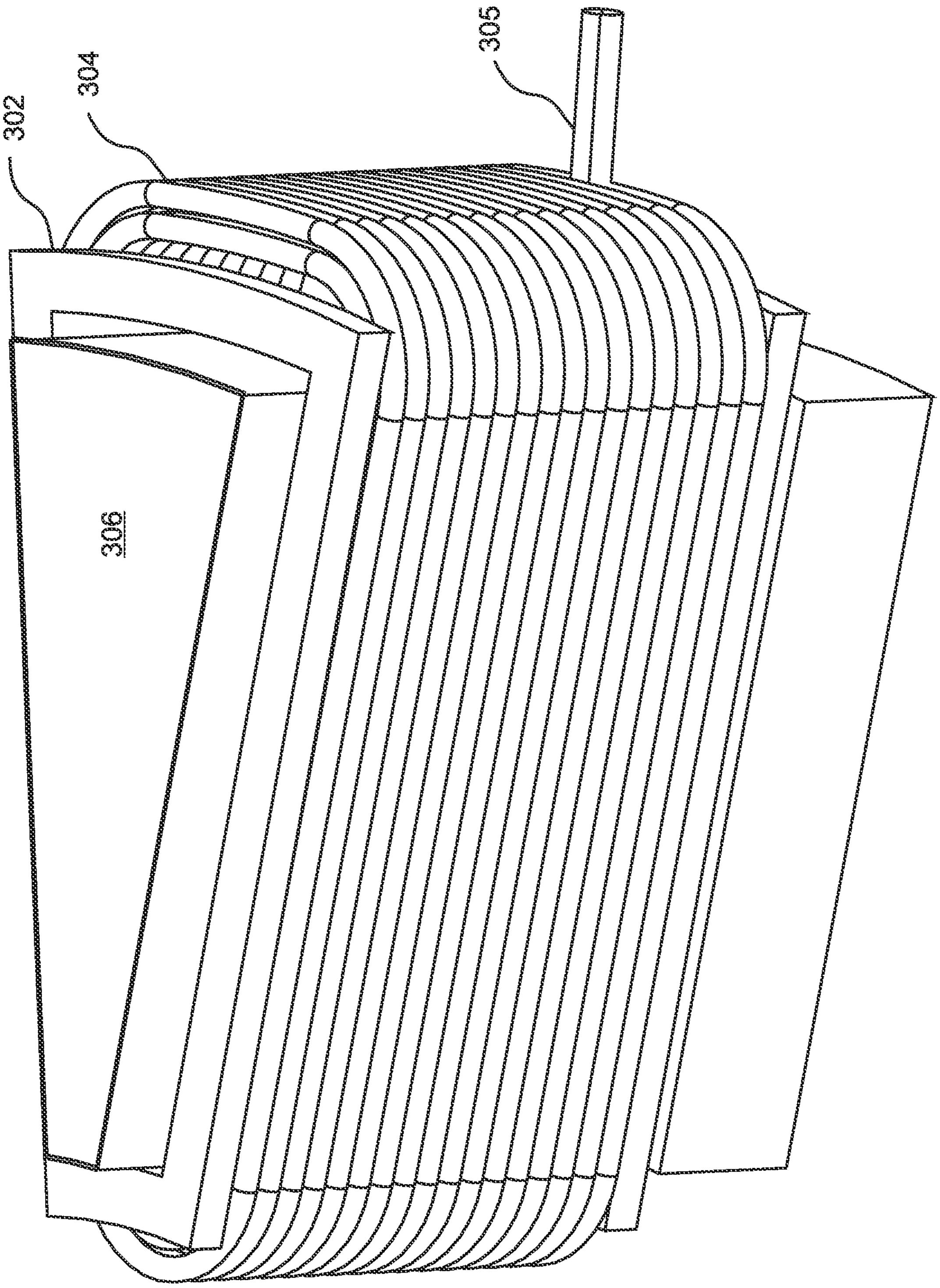
FIG. 3B is a perspective view, drawn to scale, of the coil and coil spool of FIG. 3A placed on a fixture according to an embodiment of the present invention.
Figure 3C:
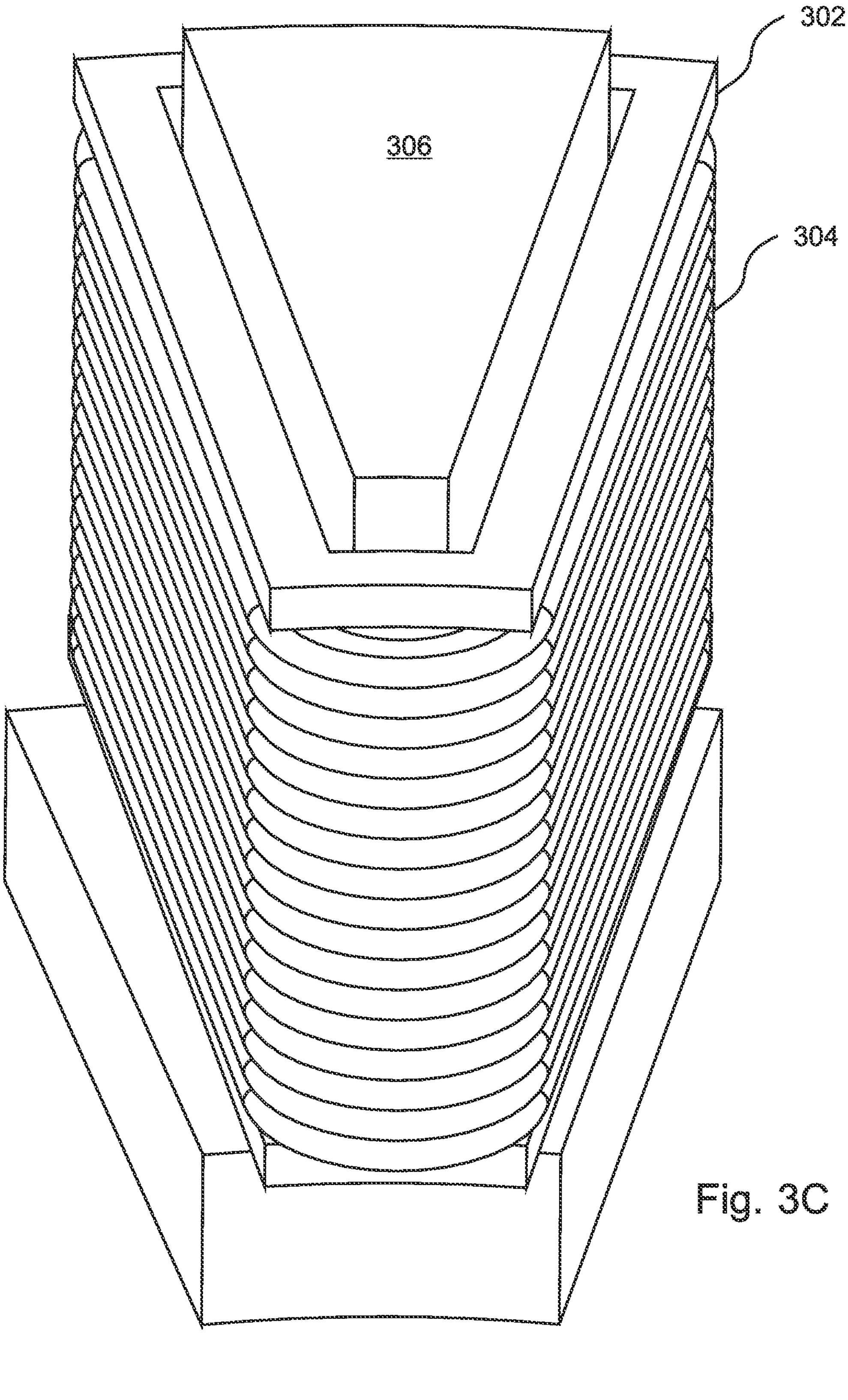
FIG. 3C is a front perspective view, drawn to scale, of the assembled elements of FIG. 3B.

With reference to FIGS. 3B and 3C, once the insulated wire has been wrapped around the coil spool 302 to form the electrical coil 304, the coil spool 302 is placed onto a fixture 306 having substantially the same shape as the winding core 234 to which the individual winding assembly 300 will eventually be applied, and a release agent is applied to the electrical coil 304.

Figure 3D:
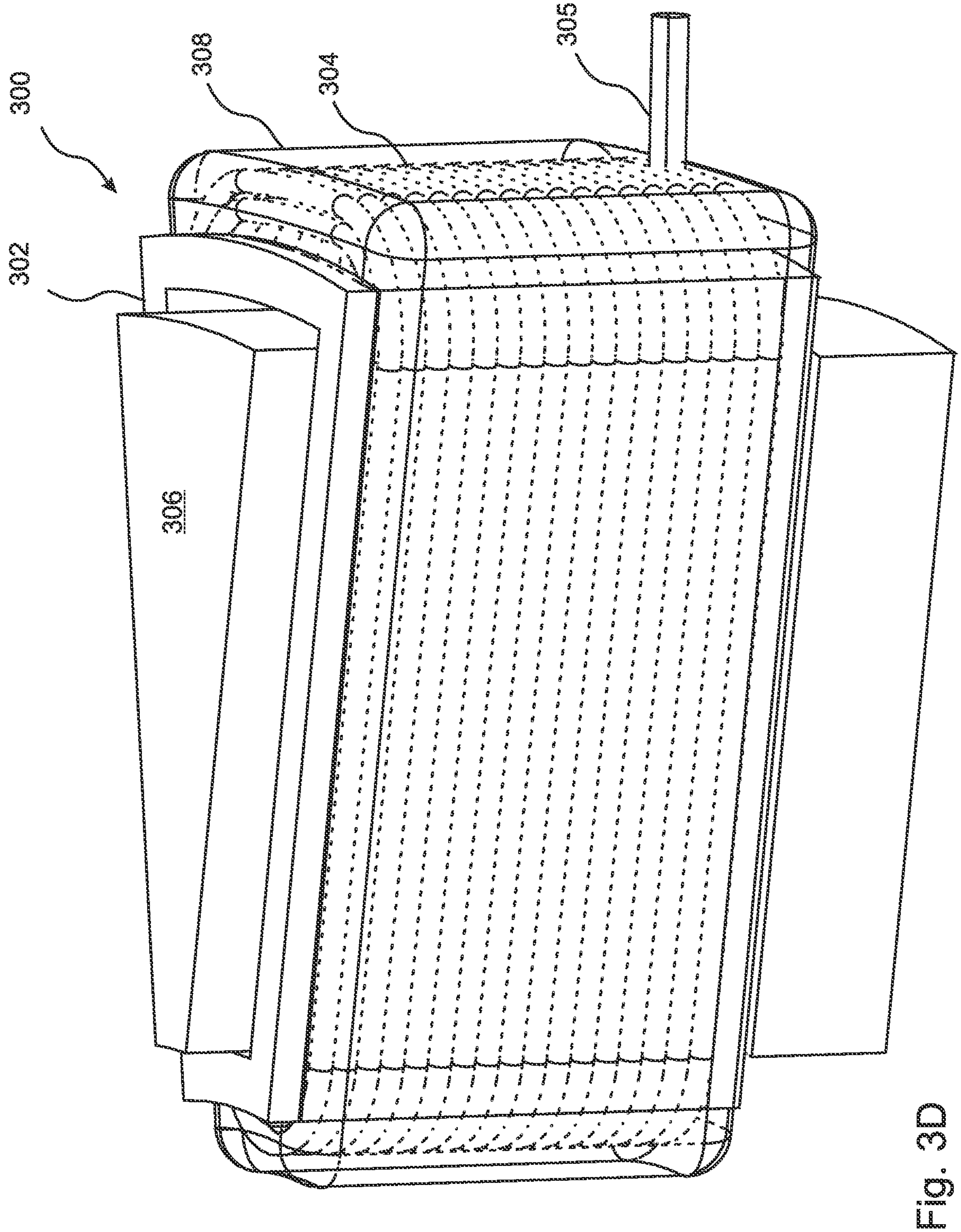
FIG. 3D is a side perspective view, drawn to scale, of the assembled elements of FIG. 3B after application to the coil of a barrier material according to an embodiment of the present invention.

With reference to FIG. 3D, a barrier material 308, such as an epoxy resin, is then applied to the electrical coil 304, thereby mechanically securing the electrical coil 304 to the coil spool 302 to form an individual winding assembly 300, while the release agent prevents direct bonding of the barrier material 308 to the electrical coil 304. The barrier material 308 thereby provides structural support to the electrical coil 304 without being directly bonded to the insulated wires of the electrical coil 304, which reduces or eliminates thermal stress between the electrical coil 304 and the barrier material 308 when the stator 400 is cooled to cryogenic temperatures. In embodiments, a vacuum pressure impregnation (VPI) process is used to apply the epoxy or other barrier material 308 to the electrical coil 304. In various embodiments, the CTE of the barrier material 308 is closely matched to the CTE of the insulated wire of the electrical coil 304, thereby reducing thermal stress between the barrier material 308 and the electrical coil 304 when the stator 400 is cooled.

Figure 3E:
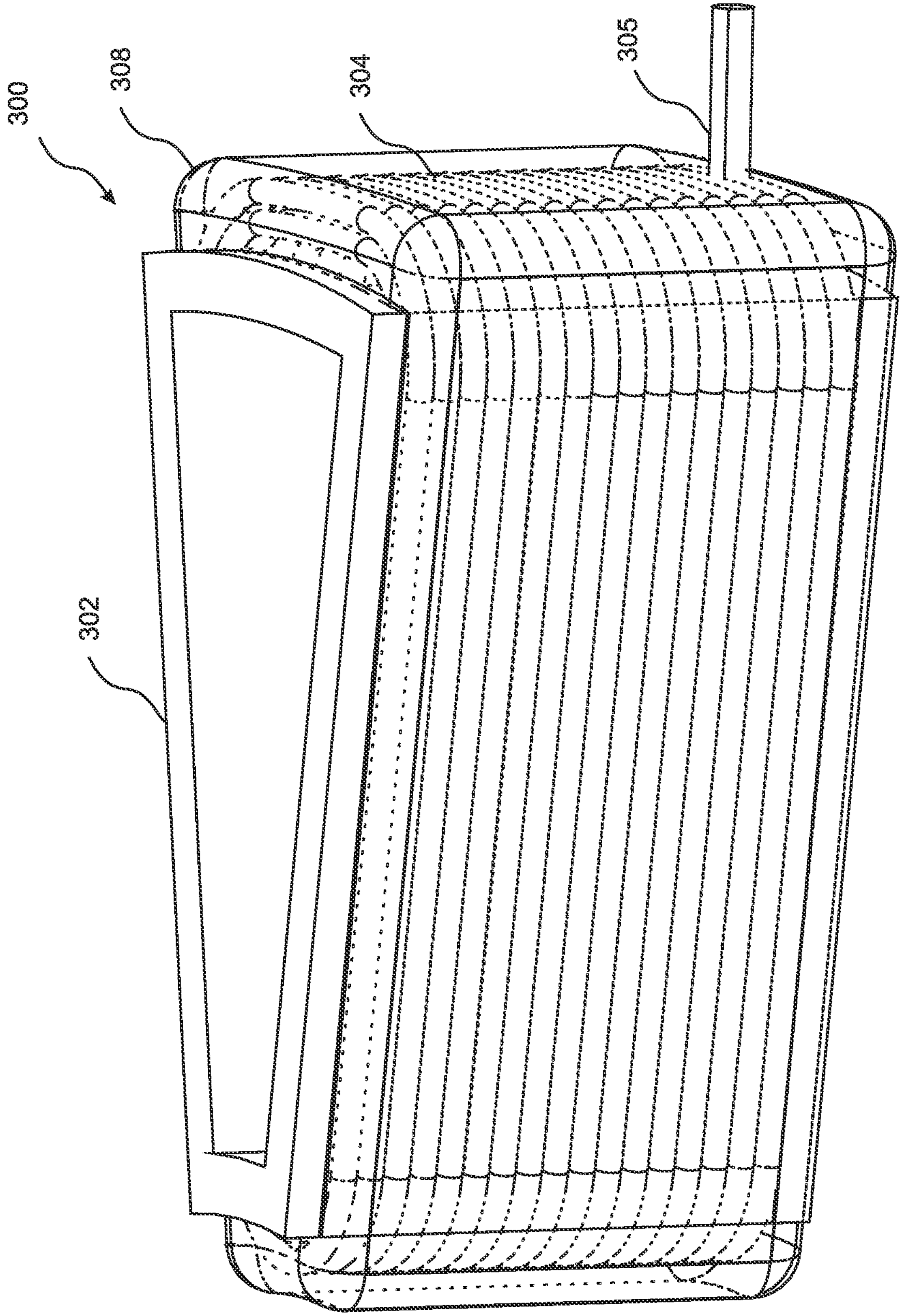
FIG. 3E is a side perspective view, drawn to scale, of the assembled elements of FIG. 3B with the barrier material applied thereto, after removal thereof from the fixture, according to an embodiment of the present invention.

With reference to FIG. 3E, the resulting individual winding assembly 300, comprising the electrical coil 304 and hollow coil spool 302 with barrier material 308 applied thereto, is then removed from the fixture 306.

Figure 4A:
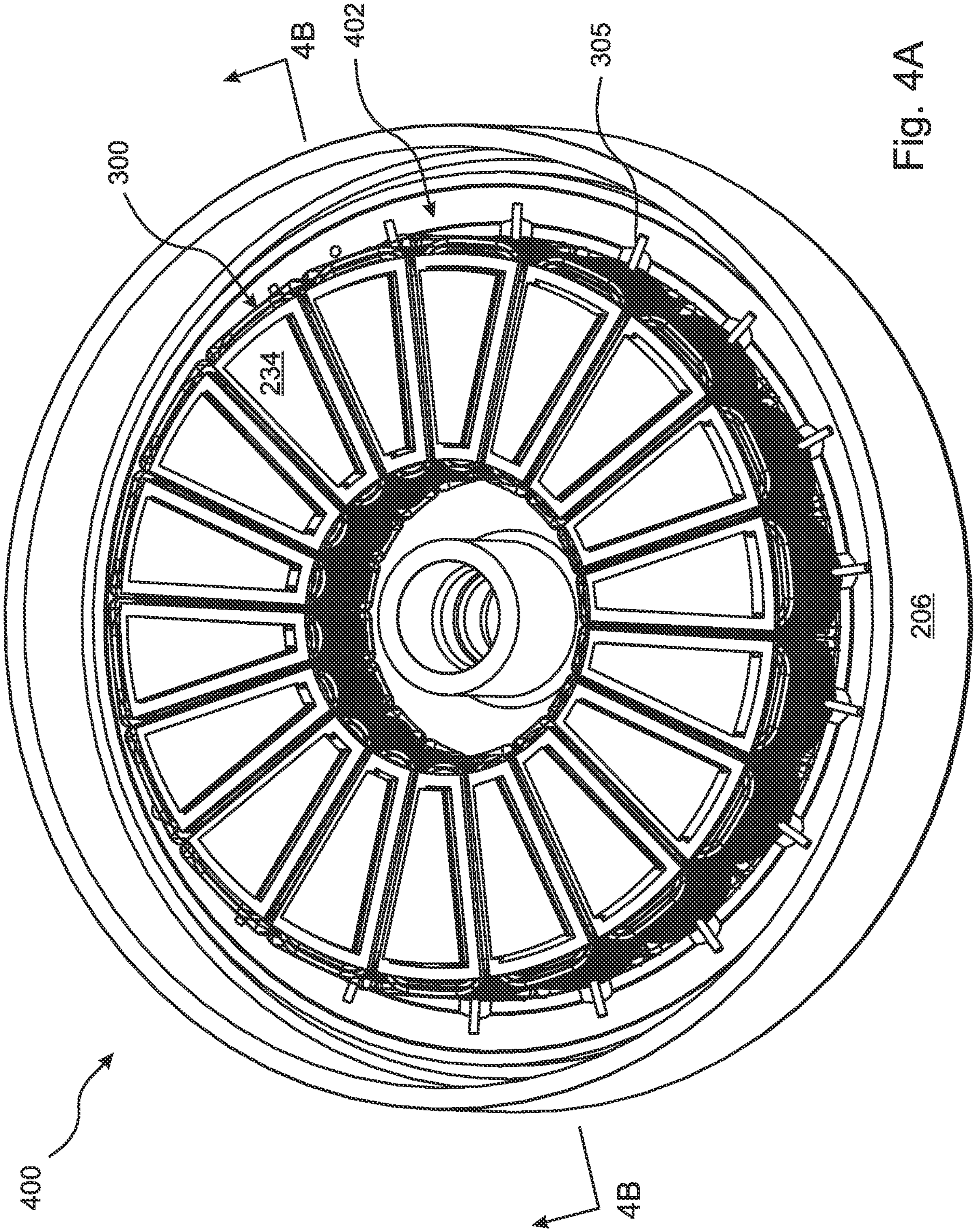
FIG. 4A is a perspective view from above, drawn to scale, of a stator included in an embodiment of the present invention.

With reference to FIG. 4A, the stator coil assembly 402 is assembled by placing each of the individual winding assemblies 300 directly onto one of the winding cores 234 of the stator 400, without applying any resin or otherwise bonding the winding cores 234 with the coil spools 302 of the individual winding assemblies 300. In the illustrated embodiment, the winding cores 234 are ferromagnetic cores, such as laminated iron or steel cores. Because the coil spools 302 are non-metallic, they shrink more than the ferromagnetic cores 234 when the coil assembly 402 is cooled to a cryogenic temperature, and are strongly held to the ferromagnetic cores 234 by compression fits.

Figure 4B:
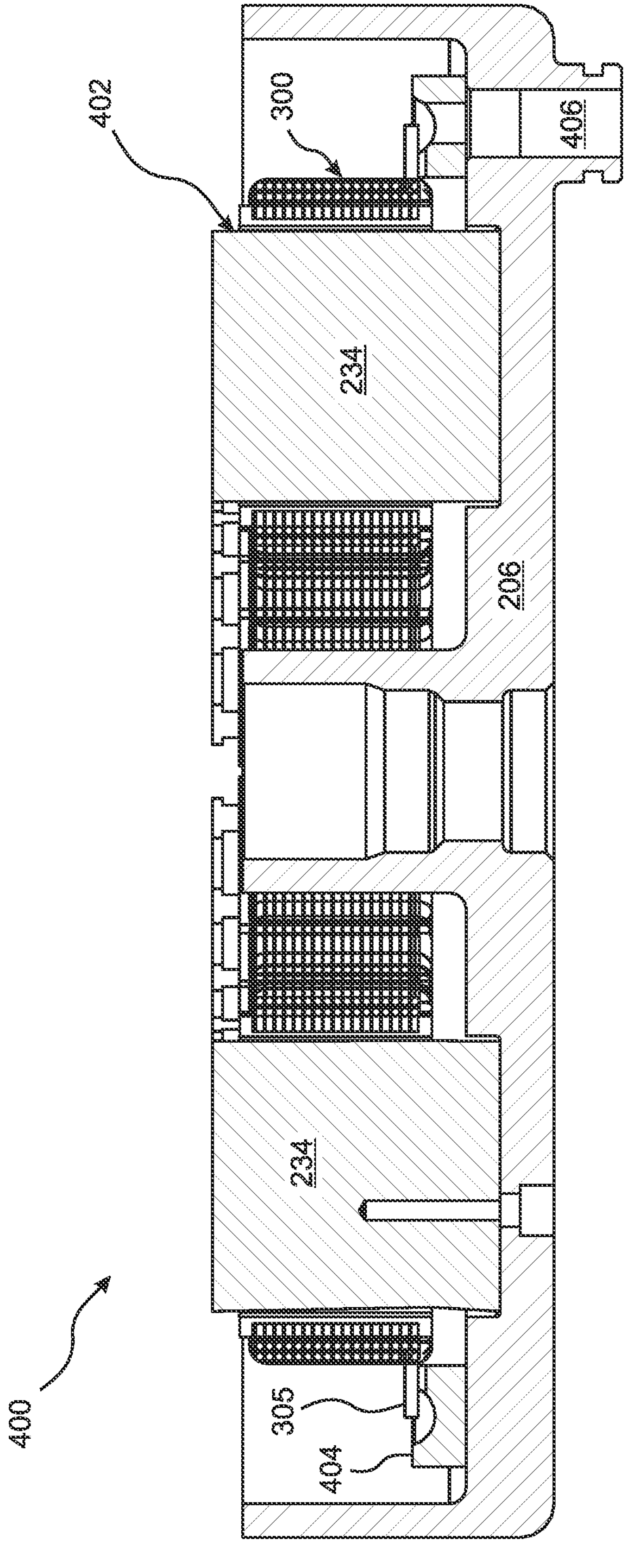
FIG. 4B is a side sectional view, drawn to scale, of the stator of FIG. 4A.

FIG. 4B is a sectional side view of the stator 400 of FIG. 4A. It can be seen in FIG. 4B that a wire exit port 406 is provided in the stator housing 206 to allow interconnection with the coils 304 of the coil assembly 402.

Figure 5:
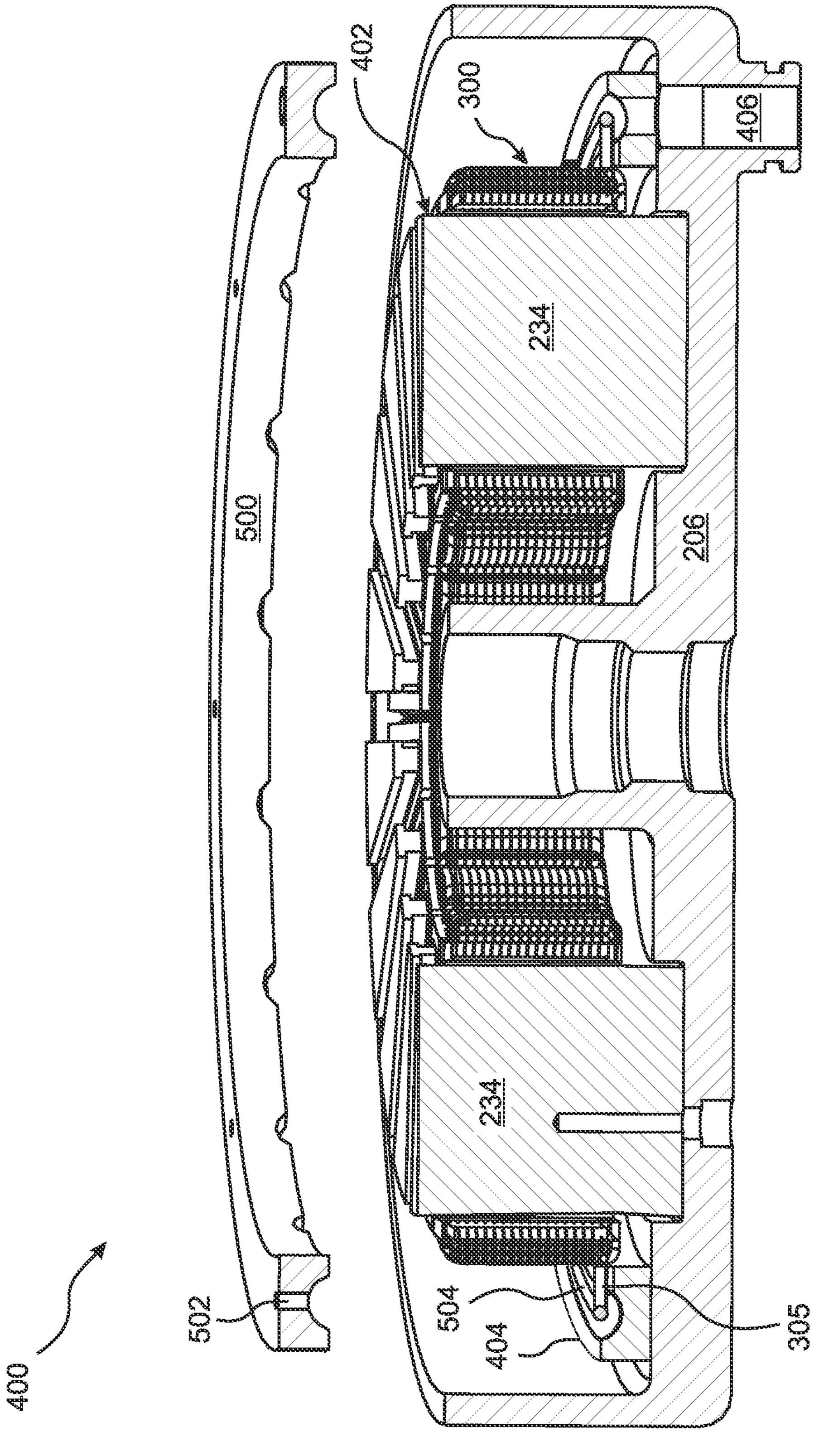
FIG. 5 is a perspective side sectional view, drawn to scale, of the stator of FIG. 4B after interconnection of the coils.
Figure 6:
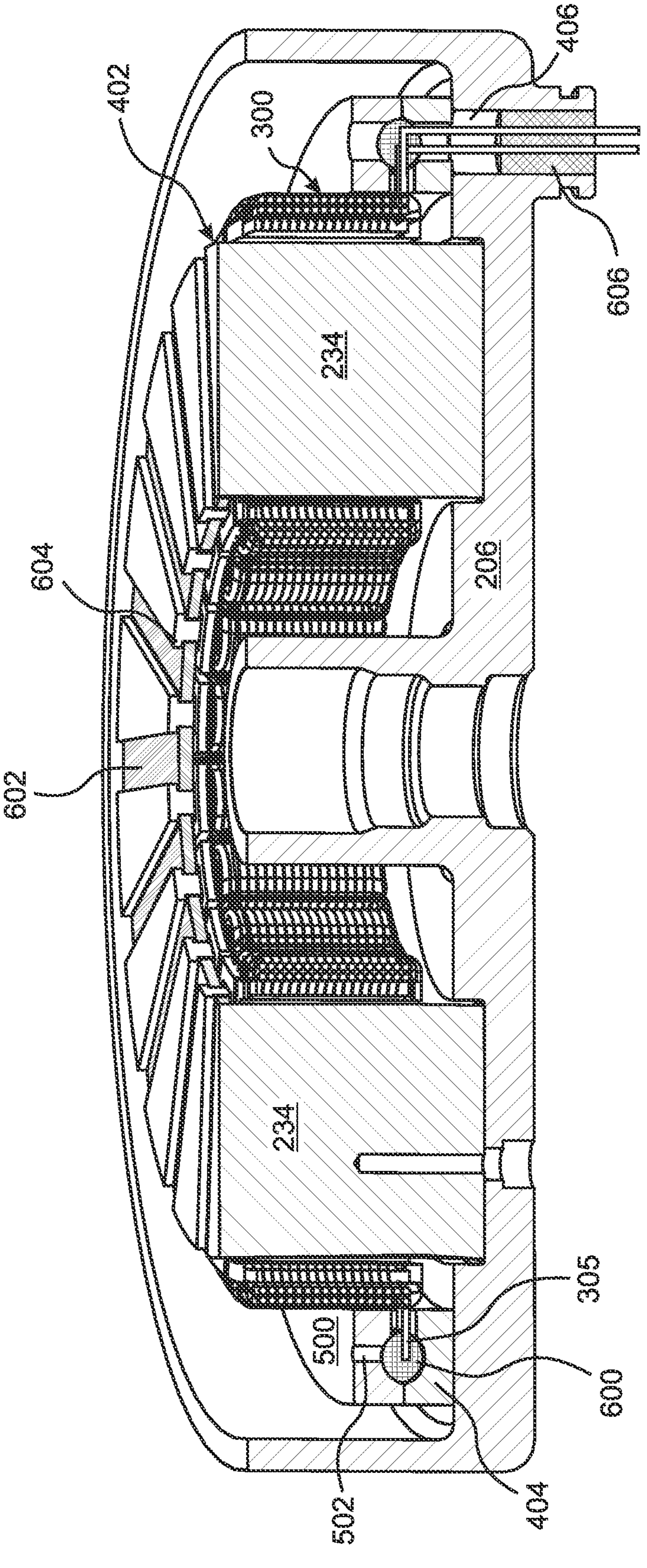
FIG. 6 is a perspective side sectional view, drawn to scale, of the stator of FIG. 5 wherein the interconnections between the coils are routed in a wire harness cavity and surrounded by a barrier material, according to an embodiment of the present invention.

With reference to FIGS. 5 and 6, once the individual winding assemblies 300 have all been prepared and placed onto the winding cores 234, the lead wires 305 of the coils 304 are interconnected with each other, and/or with an external power source 210 (for IMPs) or external power receptor (for IMTs), by wired connections 504, for example in a star or delta pattern. In embodiments, the wired connections 504 are brazed to the lead wires 305. In various embodiments, the wired connections 504 are routed within a wire harness that is formed as an internal wire harness cavity 600 between two cylindrical bracket support components 404, 500. A release agent is applied to the insulated wires of the wired connections 504 before the bracket support components 404, 500 are assembled together.

In embodiments, at least one fill port 502 is provided in the upper bracket support component 502 through which the wire harness cavity 600 is filled with a stabilizing material, such as an epoxy resin. Due to application of the release agent to the wired connections 504, the stabilizing material provides structural support to the wired connections 504 within the wire harness cavity 600, but is not bonded to the wired connections 504, nor to the wire harness cavity 600.

As noted above, the individual winding assemblies 300 are placed over the winding cores 234 without being bonded thereto. Some embodiments rely exclusively on an interference fit to avoid inadvertent dislodging of the winding assemblies 300 from the winding cores 234 when the coil assembly 402 is at ambient temperature. In the embodiment of FIG. 6, key-stock pieces 602 are inserted above and between the winding assemblies 300, and are held in place by overhanging "teeth" 604 provided at the tops of the winding cores 234. In some of these embodiments, the key-stock pieces 602 are made from the same, or from a similar, non-metallic material as the coil spools 302, and in various embodiments they are not bonded in place, thereby allowing for greater flexibility and tolerance of thermal contractions.

Finally, in embodiments, a wire feedthrough 606 is inserted into the cable exit port 406 that is provided in the stator housing 206, thereby providing electrical access to the coils 304 of the stator 400 while excluding process liquid from flowing past the wire feedthrough 606.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. An integrated motor pump (IMP) or integrated motor turbine (IMT) configured for application to a process liquid, the IMP or IMT comprising a coil assembly, wherein the coil assembly comprises:

a plurality of winding cores provided within a coil assembly housing;

a plurality of individual winding assemblies, each of the individual winding assemblies comprising:

a hollow, non-metallic coil spool; and an electrical coil wound about the coil spool;

a barrier material surrounding and impregnating the electrical coil, the electrical coil being held in place about the coil spool by the barrier material, wherein said barrier material mechanically supports the electrical coil but is not bonded to the electrical coil and is not bonded to the coil spool; and a plurality of wired connections configured to provide electrical communication among the electrical coils and/or between the electrical coils and an external power source or power receptor;

wherein, for each of the winding cores, a corresponding one of the plurality of individual winding assemblies is installed over the winding core, such that the winding core extends within and through a central cavity of the coil spool of the individual winding assembly, the individual winding assembly being constrained in location by the winding core without being bonded to the winding core.

2. The IMP or IMT of claim 1, wherein the winding cores are ferromagnetic laminates.

3. The IMP or IMT of claim 1, wherein the coil spool is made from an engineering plastic or a glass-filled fluoropolymer.

4. The IMP or IMT of claim 1, wherein the barrier material is a resin.

5. The IMP or IMT of claim 1, wherein the wired connections are routed through a wire harness cavity.

6. The IMP or IMT of claim 5, wherein the wire harness cavity is formed between bracket support components.

7. The IMP or IMT of claim 6, wherein the wire harness cavity is filled with a stabilizing substance that mechanically supports the wired connections but is not bonded to the wired connections, and is not bonded to the wire harness.

8. The IMP or IMT of claim 7, wherein the stabilizing substance is a resin.

9. The IMP or IMT of claim 1, further comprising a wire feedthrough inserted into a cable exit port provided in the coil assembly housing, the wire feedthrough providing electrical access to the wired connections while excluding the process liquid from flowing past the wire feedthrough.

10. The IMP or IMT of claim 1, further comprising a plurality of key-stock pieces positioned above the individual winding assemblies and configured to prevent dislodging of the individual winding assemblies from the winding cores.

11. The IMP or IMT of claim 10, wherein the key-stock pieces are inserted between upper surfaces of the individual winding assemblies and overhanging teeth of the winding cores.

12. The IMP or IMT of claim 11, wherein the key-stock pieces are not bonded to the individual winding assemblies and are not bonded to the overhanging teeth of the winding cores.

13. A method of manufacturing a coil assembly of an integrated motor pump (IMP) or integrated motor turbine (IMT), the method comprising:

providing a plurality of winding cores;

preparing a plurality of individual winding assemblies, wherein for each of the individual winding assemblies, said preparing of the individual winding assembly comprises:

winding insulated wire about a hollow, non-metallic coil spool, the insulated wire being thereby formed into an electrical coil;

placing the coil spool together with said electrical coil onto a fixture, said fixture having a shape that is substantially identical to a shape of a corresponding one of the plurality of winding cores;

applying a first release agent to the electrical coil;

applying a barrier material to surround and impregnate the electrical coil, such that said barrier material mechanically supports the electrical coil but is prevented by the first release agent from bonding to the electrical coil, the coil spool, electrical coil, and applied barrier material thereby forming the individual winding assembly; and removing the individual winding assembly from the fixture;

for each of the winding cores, installing a corresponding one of the plurality of individual winding assemblies over the winding core, such that the winding core extends within and through a central cavity of the coil spool of the individual winding assembly, the individual winding assembly being constrained in location by the winding core without being bonded to the winding core; and forming a plurality of wired connections to the electrical coils, wherein the wired connections provide electrical communication among the electrical coils and/or between the electrical coils and an external power source or an external power receptor.

14. The method of claim 13, wherein the method further comprises routing the wired connections through a wire harness cavity of the coil assembly.

15. The method of claim 14, wherein the wire harness cavity is formed between bracket support components.

16. The method of claim 15, wherein the method further comprises:

applying a second release agent to the wired connections; and filling the wire harness cavity with a stabilizing substance such that the stabilizing substance mechanically supports the wired connections but is prevented by the second release agent from bonding to the wired connections and from bonding to the wire harness.

17. The method of claim 16, wherein the stabilizing substance is a resin.

18. The method of claim 13, further comprising positioning key-stock pieces above the individual winding assemblies such that the key-stock pieces prevent dislodging of the individual winding assemblies from the winding cores.

19. The method of claim 18, wherein installing the key-stock pieces includes inserted the key-stock pieces between upper surfaces of the individual winding assemblies and overhanging teeth of the winding cores.

20. The method of claim 19, wherein installing the key-stock pieces does not include bonding the key-stock pieces to the upper surfaces of the individual winding assemblies, and does not include bonding the key-stock pieces to the overhanging teeth of the winding cores.

* * * * *